June 29, 1937.  L. W. LUTHER  2,085,110
SLICING AND TRAYING MACHINE
Filed Feb. 26, 1931  4 Sheets-Sheet 1
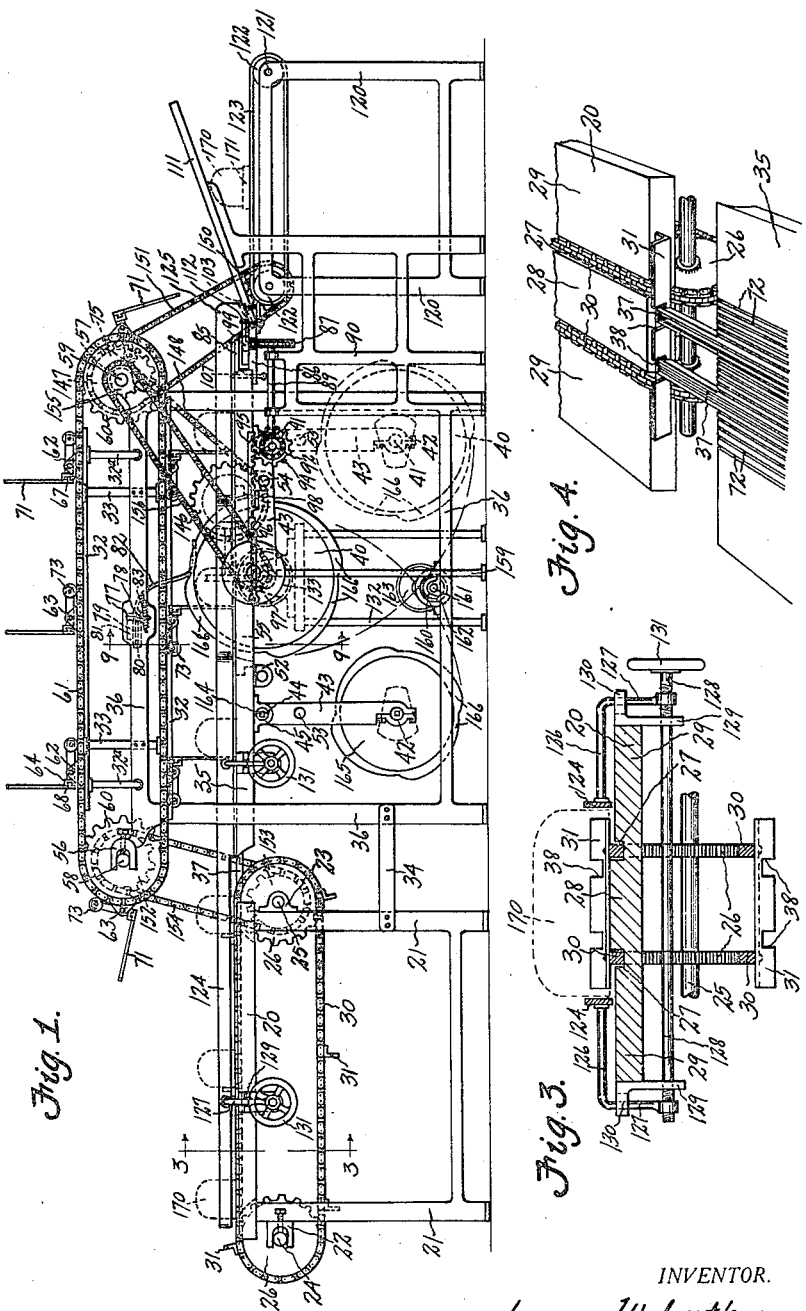
INVENTOR.
Leroy W. Luther.
BY
ATTORNEY.

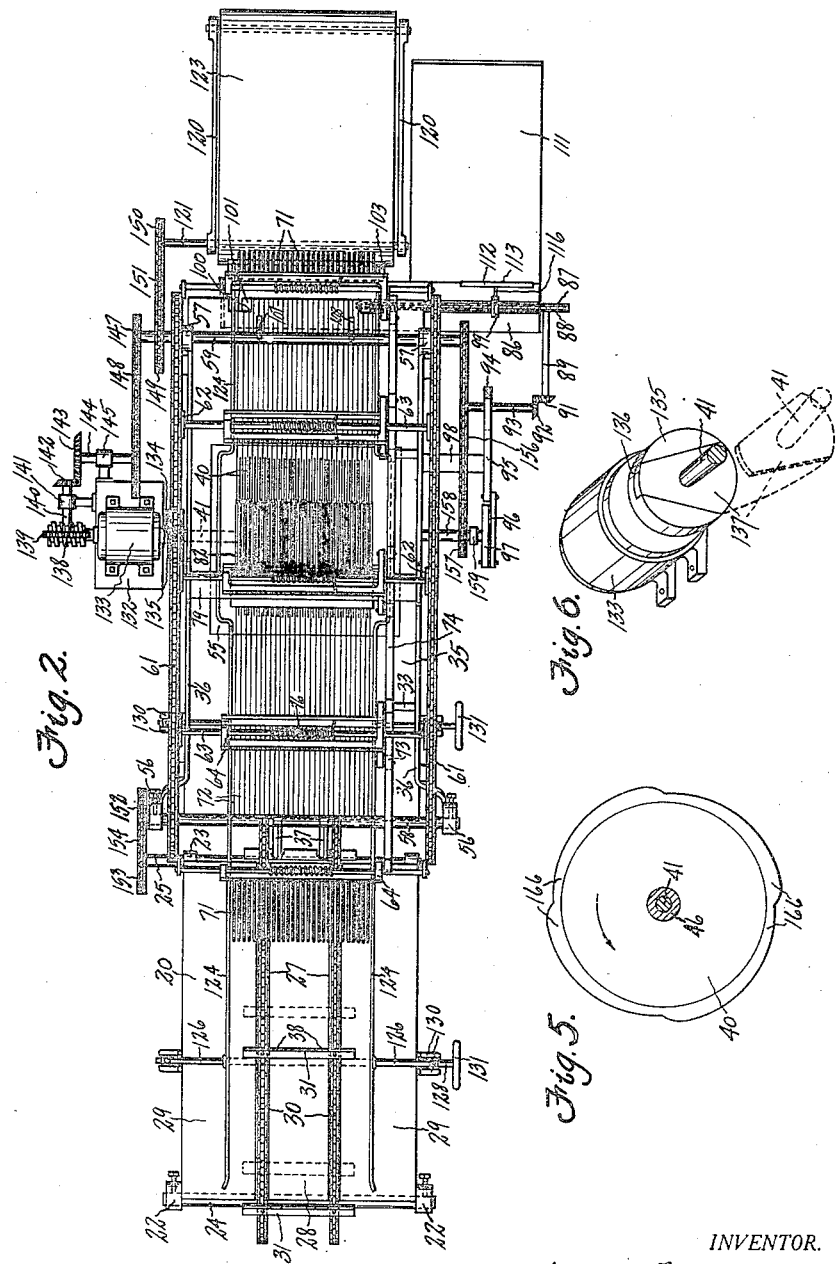

June 29, 1937.  L. W. LUTHER  2,085,110
SLICING AND TRAYING MACHINE
Filed Feb. 26, 1931  4 Sheets-Sheet 3

INVENTOR.
Leroy W. Luther.
BY
ATTORNEY.

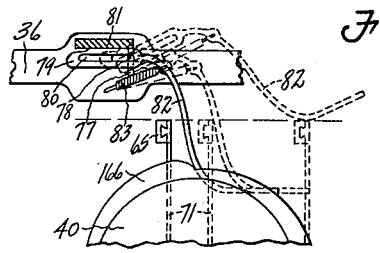
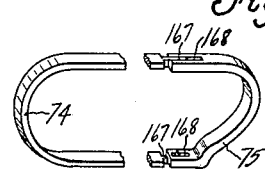
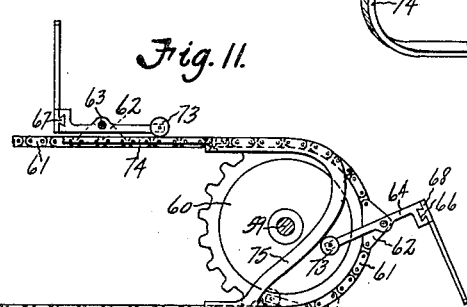
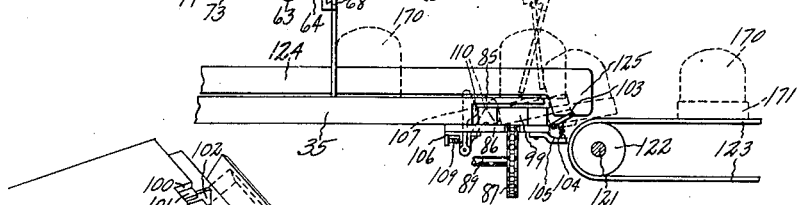
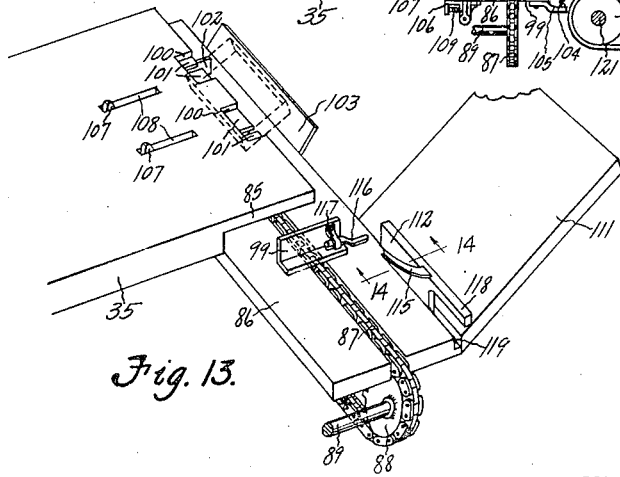
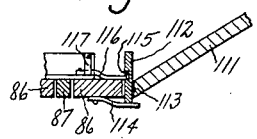

Patented June 29, 1937

2,085,110

UNITED STATES PATENT OFFICE 2,085,110

SLICING AND TRAYING MACHINE

Leroy W. Luther, South Bend, Ind.

Application February 26, 1931, Serial No. 518,451

8 Claims. (Cl. 146—98)

The invention relates to machines for slicing a body of material and placing it as a unit automatically in a tray, and particularly to machines for slicing and traying loaves of bread, and has for its object to provide a device of this character in which successive loaves of bread are fed continuously in spaced relation to slicing knives and thence to a traying device in loaf-like position by suitable means operating at high speed, the bread being delivered to a discharge point sliced and mounted in trays without handling between the receiving and discharge ends of the device.

A further object is to provide a device of this character including a series of cooperating conveyors and propellers adapted to move individual loaves of bread to and through suitable slicing and traying means in rapid continuous movement and to deliver the sliced bread in trays at the discharge end of the device.

A further object is to provide a device of this character having a set of spaced slicing knives with a propeller carrying a set of spaced fingers adapted to pass between the knives and by means of which loaves of bread may be propelled to and through the knives and thence the sliced bread may be propelled away from the knives.

A further object is to provide a device of this character having a support mounting a set of spaced knives and a propeller carrying a set of fingers adapted to pass between the knives, said fingers engaging guide means carried by said support by which they may be guided between said knives.

A further object is to provide a device of this character having a plurality of sets of knives adapted to be easily and selectively disposed in bread-slicing position, said knives each being adapted to slice a predetermined kind of bread, and means for readily coupling any set of knives with the driving mechanism.

A further object is to provide a device of this character having adjustable guide members which guide the loaves of bread while propelled to and through the slicing knives and thence guide and vertically position the sliced bread while propelled from the slicing knives to the traying device.

A further object is to provide a device of this character having slicing knives and propellers moving bread through said knives with means cooperating with said knives and propellers to prevent displacement of the slices of bread when discharged from said knives.

A further object is to provide a device of this character having a propeller carrying sets of fingers adapted to move bread through said device, said sets of fingers being readily removable from said propeller to permit insertion of sets of fingers particularly adapted to move different kinds of bread through the device.

A further object is to provide a device of this character having a device for placing sliced bread in trays and means for propelling the sliced bread to the traying device, with means cooperating with said propelling means to withdraw the same from engagement with the bread when the bread has been deposited at the traying device.

A further object is to provide a device of this character in which sliced bread is propelled to a traying device by which a tray is positioned to receive the sliced bread as it is moved by a propeller, and having a discharge conveyor in juxtaposition thereto by which the tray is carried to a discharge point after the bread has been deposited therein.

A further object is to provide a device of this character having a cutting table along which bread is slid by a propeller with a traying device including means for disposing a bread tray beneath said table at the end thereof, means actuated by the movement of the bread to tilt said tray to bread-engaging position whereby movement of the bread will move the tray from beneath said table to permit the bread to drop into the tray when it leaves said support, and a discharge conveyor in juxtaposition to said tray positioning means and adapted to receive the bread and tray after the bread has been deposited on the tray.

A further object is to provide a device of this character having a traying means including reciprocating means for disposing a tray in bread-receiving position, an inclined tray feeding plate communicating with said reciprocating means, and a partition disposed between said reciprocating means and tray feeding plate and actuated by said reciprocating means to intermittently feed a tray to said reciprocating means.

A further object is to provide a device of this character having a plurality of sets of cutting knives adapted to be selectively disposed in operative cutting position, and means for sharpening said knives, said knives being adapted to be selectively positioned in operative engagement with said sharpening means.

A further object is to provide a continuously operating device of this character having a table supporting a set of spaced rotary cutting knives, a conveyor adapted to successively dispose loaves of bread on said table, an elevated propeller adapted to slide said individual loaves of bread along said table to and through said knives, a traying device in juxtaposition to said table by which the sliced bread is deposited in trays at the end of said table, and a conveyor adapted to carry the bread and tray from said traying device to the discharge end of said device.

With the above and other objects in view, the invention resides in the combination and arrangement of parts as hereinafter set forth, shown in the drawings, described and claimed, it being understood that changes in the precise embodiment of the device may be made within the scope of what is claimed without departing from the spirit of the invention.

In the drawings:

Figure 1 is a view of my device in side elevation.

Figure 2 is a top plan view of my device.

Figure 3 is a transverse vertical sectional view of my device taken on line 3—3 of Figure 1.

Figure 4 is a fragmentary perspective view of the receiving end of the knife table and the discharge end of the feed conveyor carrying the bread to said table.

Figure 5 is a view in elevation of the bread cutting knife.

Figure 6 is a perspective view of the coupling between the driving motor and the shaft carrying the knives.

Figure 10 is a fragmentary view in side elevation and partly in section of the fingers preventing the slices of bread from being thrown out of position when leaving the knives.

Figure 11 is a fragmentary view in side elevation, with certain parts omitted, of the discharge end of the knife table and propeller, and of the traying device and discharge conveyor.

Figure 12 is a fragmentary perspective view of the guide controlling the bread propeller.

Figure 13 is a fragmentary perspective view of the traying device.

Figure 14 is a vertical sectional view taken on line 14—14 of Figure 13.

Figure 7:
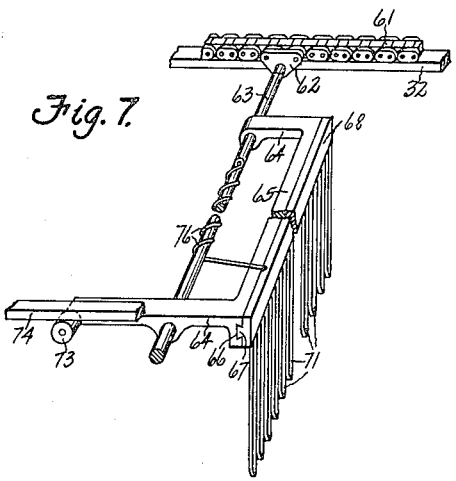
Figure 7 is a fragmentary view of the elevated propeller including the fingers for propelling the bread along the knife table.
Figure 8:
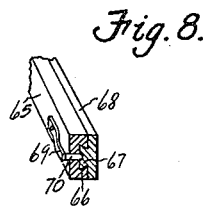
Figure 8 is a fragmentary perspective view of the finger carrying propeller frame.
Figure 9:
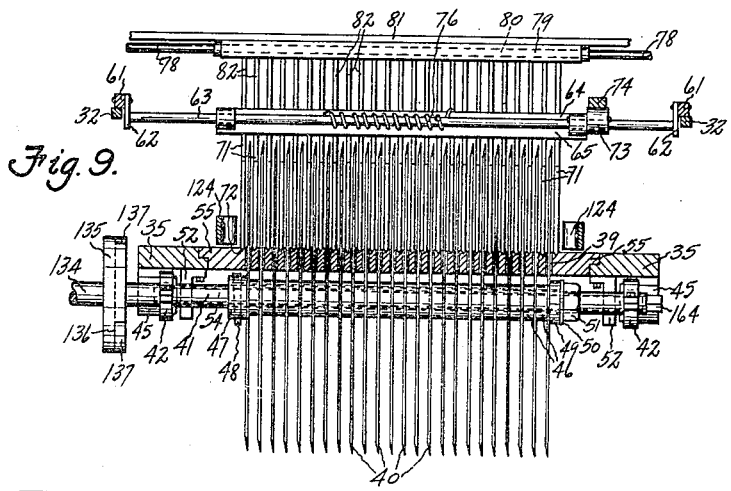
Figure 9 is a vertical transverse sectional view taken on line 9—9 of Figure 1.

Referring to the drawings, which illustrate the preferred embodiment of the invention, the numeral 20 designates a table suitably supported by legs 21 which carry bearings 22 and 23 in which shafts 24 and 25 are journaled in spaced relation below the table top 20. Sprockets 26 are mounted on shafts 24 and 25 and pass through grooves, (not shown) in the table top 20, the upper teeth of said sprockets projecting slightly above the top of the table. The upper surface of the table 20 is provided with a pair of spaced, parallel longitudinal grooves 27, and the portion 28 of the table top intermediate said grooves is of greater thickness and projects above the portions 29 of the table on the outer sides of said grooves. Endless chains 30 carried by sprockets 26 pass through the grooves 27 whereby the upper sides of said chains project slightly above the portion 28 of the table. Mounted on chains 30 in equally spaced relation are a plurality of transverse members 31, preferably of angle iron which pass over the intermediate portion 28 of the table and are adapted to propel loaves of bread disposed thereon. The bearings 22, as shown in Figure 1, are adjustable to tighten or loosen the chains 30 as desired.

A knife or cutter table 35 supported by a frame 36 is disposed in longitudinal alignment with conveyor table 20 and in spaced relation thereto and is provided at its receiving end with a pair of longitudinal bars or arms 37 which terminate in closely spaced relation to the conveyor table 20, the frame 36 and table 35 being rigidly connected by bars 34. The transverse bars 31 carried by chains 30 are recessed at 38 in registration with the arms 37 to pass the ends of said arms, which may thus be spaced from table 20 only the small distance necessary to permit clearance of the chains 30 and the base of the bars 31 when passing over the adjacent sprockets 26. In the center of the table 35 are formed a plurality of spaced, parallel, longitudinal slots 39 in transverse alignment through which a set of circular knives 40 are adapted to project from the under side of the table. The knives 40 are fixedly mounted on a rotary shaft 41 which is journaled at its ends in separable bearings 42 carried by the ends of arms 43 mounted on a transverse bar 44 pivotally carried by bearings 45 secured to the bottom of the table 35, said bar 44 having one end 164 squared to fit a crank or other suitable means for rotating the bar to swing the knives 40 into or out of operative cutting position relative to the cutting table. Spacers 46 are mounted on shaft 41 between the knives 40 to position the knives in properly spaced relation, and one end of the set of knives is positioned on shaft 41 by a collar 47 positioned on the shaft by a tapered pin 48 while the other end of the set of knives is held by a collar 49 on whose outer end bears a lock washer 50 held in place by a jam nut 51 threaded to the shaft. Brackets 52 are carried by the under side of the table 35 between bearings 45 and slots 39 and are provided with an aperture registering with apertures 53 in arms 43, and a tightly fitting bar 54 may be slid into said apertures to hold the set of knives 40 in operative position projecting through slots 39 and above the table 35. When desired the table 35 may be provided with a center section 55 in which the slots 39 are formed, and which is readily removable and replaceable to accommodate sets of knives of different spacing. An auxiliary set of knives 165 adapted to slice a different kind of bread or having a different spacing are mounted under the table 35 by a set of arms 43 on the end thereof opposite the mounting of knives 40 and are adapted to be locked in operative cutting position relative to the cutting table in place of knives 40 when desired. Both knives 40 and 165 are provided with a circumferential series of cutting edges 166 which recede inwardly in counterclock direction and are particularly adapted for slicing bread when rotating at high speed.

Carried by the frame 36 in spaced relation above the table 35 are bearings 56 and 57 which journal transverse shafts 58 and 59, the bearings 56 being adjustable to permit shifting of the shaft 58 therein. A pair of sprocket wheels 60 is carried by each of said shafts in spaced relation and mount a pair of endless chains 61 extending longitudinally above the table 35. Equally spaced registering brackets 62 whose spacing coincides with the spacing of bars 31 on chains 30 are carried by the inner sides of chains 61, said registering brackets carrying the opposite ends of rods 63. Rotatably mounted at the center of each rod 63 is a U-shaped carrier member 64 whose transverse portion 65 extends parallel to rod 63 and transverse of the table 35. The outer end of the transverse portion 65 of the U-shaped member 64 is provided with a groove 66 whose sides are tapered and which is adapted to receive a wedge-shaped tongue 67 carried by a bar 68, said tongue and groove holding said members 65 and 68 against displacement. On the inner side of the member 65 is carried a spring 69 which carries a pin 70 which extends through a suitable bore in member 65 and whose inner end engages a recess in the tongue 67 to prevent longitudinal sliding of the member 68 relative to member 65. The bar 68 carries a set of spaced fingers 71 whose ends are adapted to engage and seat in spaced longitudinal grooves 72 formed in table 35 and passes between the knives 40 and guides the fingers along the table and between the knives. One of the arms of the U-shaped member 64 extends rearwardly and carries a roller 73 in spaced relation to the bar 63, said roller running on a guide member 74 which is inwardly spaced from one chain 61 and registers therewith except for a cam portion described thereinafter, and which is supported by brackets 33 carried by frame 36. The guide member 74 positions the U-shaped member 64 to hold the fingers 71 perpendicular to chains 61 and vertically relative to table 35, being of a shape conforming to the configuration of the endless chain, at all points in the movement of the U-shaped members except at the discharge end of the table where the guide member is cam-shaped at 75. A coil spring 76 encircles rod 63 with one end fixed thereto and with its free end bearing upon the portion 65 of U-shaped member 64, and thus when the U-shaped member reaches the cam member 75 the spring 76 throws said member and fingers 71 out of operative position relative to the table for purposes to be hereinafter set forth. The cam 75 is preferably separate from the balance of guide 74 and has an adjustable tongue and groove connection 167, 168 therewith as illustrated in Figure 12. Bars 32 mounted on arms 32ª carried by the frame 36 support the chains 61 in horizontal operative position between the sprockets 60.

A vertical slot 77 is formed in the frame member 36 at a point above the knives 40 and in this slot a transverse rod 78 is mounted and vertically adjustable. A transverse plate 79 is carried by rod 78 by means of a longitudinal slot or opening 80 extending therethrough and through which the rod passes, said slot 80 being of a width to permit movement of the plate 79 relative to the rod. The plate 79 is normally horizontally positioned by means of a bar 81 carried by frame 36 and overlying said plate 79, said bar 81 having its rear edge extending slightly beyond the vertical projection of rod 78 in the direction in which the bread moves on the table to prevent tilting of the plate 79 as illustrated in Figure 10 in full lines. Spaced fingers 82 are carried by plate 79 and have the shape of a reverse curve terminating in a portion normally parallel to table 35 in spaced relation thereabove, the ends of said fingers extending between the knives 40 from a point substantially centrally of the knives to a point adjacent the delivery edge thereof. Springs 83 extend between the frame 36 and the upper ends of fingers 82 to hold the plate 79 forwardly on rod 78.

The discharge end of table 35 is provided with a thin transverse end plate 85 under which and in spaced relation to which extends a transverse plate 86 projecting beyond the table at one side thereof. The plate 86 is centrally longitudinally grooved from its outer end to a point below end plate 85, and through this groove extends an endless chain 87 carried by sprockets 88 mounted on shafts 89 one of which is carried by a frame member 90, said chain having its upper edge positioned substantially in the plane of the upper surface of said plate. The chain 87 is adapted to be reciprocated by means of a bevel gear 91 carried by the outer shaft 89 and engaging a bevel gear 92 carried by a shaft 93 which also carries a gear 94 driven by a rack member 95 connected to one end of a connecting rod 96 whose other end is eccentrically carried by a rotary wheel or disc 97, said rack being suitably supported in gear engaging position by a member 98 carried by table 35. A transverse angle member 99 is carried by chain 87 by which it is moved back and forth on plate 86 and beneath end plate 85 of the table. The end plate 85 is cut-away at spaced points 100 beneath each of which a pair of adjustable plates 101 is provided for purposes to be hereinafter set forth. An adjustable stop plate 102 is carried by plate 86 adjacent one of said cut-aways 100. Hingedly mounted on the outer side of plate 86 adjacent and opposite cut-aways 100 is a plate 103 which is normally held in upwardly tilted position by springs 104 supported by a plate 105 carried by plate 86. A bracket 106 is centrally mounted on the under side of table 35 adjacent end plate 85 of the table and pivotally mounts a pair of spaced arms 107 projecting upwardly through longitudinal slots 108 in the table 35, said arms being normally held in vertical position against the forward edges of the slots 108 by means of springs 109 extending between bracket 106 and the arms. A nose or cam 110 is carried by the upper ends of the arms at one side thereof for purposes to be set forth. An inclined plate 111 carried by frame 90 communicates with the outer end of plate 86 at one side thereof, and between said plates 111 and 86 is disposed a vertical plate 112 mounted in a slot 113 formed in plate 86 at the base of plate 111. Springs 114 carried by the under side of plate 86 support the vertical plate 112 in a position normally projecting above plate 86. An inclined groove 115 is formed in plate 112 and extends from a point at its forward edge normally at the plane of the upper surface of the plate 86 to the upper edge thereof, and is adapted to be engaged by a finger 116 pivoted to the base of the angle member 99 and normally held in alignment with said member by a spring 117. An arm 118 projects rearwardly from the upper end of plate 112 and is adapted to be received in a groove 119 formed in plate 86 when depressed.

A frame 120 in juxtaposition to plates 86 and 103 and aligned with cutting table 35 mounts a pair of transverse shafts 121 which carry rollers 122, over which extends an endless belt 123 forming a discharge conveyor for the device. The belt 123 is closely positioned relative to plate 103 and in a position slightly above the depressed position of said plate for purposes to be set forth.

Guide bars 124 extend longitudinally of the feed table 20 and cutter table 35 in spaced parallel relation and terminate in plates 125 extending beyond and below the discharge end of the cutter table. The guide bars are adjustably supported as illustrated in Figure 3 by means of horizontal bars 126 which terminate in vertical bars 127 whose ends have threaded connection with a rod 128 extending transversely beneath the table. Brackets 129 carried by the sides of the table carry rod 128 and have spaced tongues 130 projecting outwardly from their upper ends between which the vertical bars 127 extend and are vertically positioned. A handwheel 131 mounted on one end of rod 128 is adapted to rotate said rod which has oppositely directed threads formed at its ends whereby turning the handwheel in one direction will move said guide bars 124 in the direction of each other and movement in the other direction will move said guide bars away from each other. The guide bars 124 are shown to be of one piece extending the length of the feed and cutter tables with an off-set adjacent the knives, but it is obvious that they may be formed in two pieces, one extending along the feed table and cutter table to the knives and the other extending from the knives to the discharge end of the table.

To one side of the cutter table 35 is disposed a support 132 for the driving motor 133 which has a shaft 134. On the shaft 134 adjacent table 35 is mounted a coupling member 135 which comprises a concentrically mounted metal disc having a wedge-shaped groove 136 formed in the inner face thereof, and on the outer end of the knife shaft 41 is mounted a complementary wedge-shaped member 137 adapted to seat in said groove when the knife shaft is locked in operative cutting position relative to the cutting table, and these coupling members thus provide a simple detachable connection between the motor shaft and either of the knife shafts. Also mounted on the motor shaft is a worm 138 with which a gear 139 mounted on shaft 140 supported by bracket 141 secured to the support 132 is in mesh. A bevel gear 142 is mounted on shaft 140 and meshes with a bevel gear 143 mounted on shaft 144 carried by bracket 145 also secured to support 132. A sprocket 146 is carried by shaft 144 in alignment with a sprocket 147 carried by shaft 59 with which it has a driving connection through endless chain 148. A speed reducing drive between the motor and shaft 59 is thus established through the worm and gear 138, 139, bevel gears 142, 143 and chain 148, whereby the chains 61 carrying the bread propelling fingers 71 are driven at a speed greatly reduced relative to the rate of rotation of the knives 40. A sprocket 149 is carried by shaft 59 in alignment with a sprocket 150 carried by the adjacent shaft 121 of discharge conveyor 123 with which it has a driving connection through endless chain 151. A sprocket 152 is mounted on shaft 58 in alignment with a sprocket 153 mounted on shaft 25 of the feed conveyor with which it has a driving connection through endless chain 154. A sprocket 155 is mounted on shaft 59 and has a driving connection through endless chain 156 with a sprocket 157 mounted on a shaft 158 suitably supported by cutter table 35 and a standard 159, said shaft 158 carrying disc 97 at its outer end. Thus the driving motor 133 has a direct, high speed driving connection with the knives 40 through coupling members 135, 137, and a reduced speed driving connection with the chains 61, from which the feed conveyor and discharge conveyor of the device and the tray feeding device are operated in predetermined timed relation.

A set of emery whels 160 of suitable configuration is mounted on a shaft 161 journaled in bearings 162 mounted on frame 36 of the cutter table in a position whereby both sets of cutting knives 40 and 165 may be swung into operative engagement therewith. A motor 163 also mounted on frame 36 is adapted to drive the shaft 161 to operate said emery wheels. One end of each of the knife carrying shafts 41 is squared to accommodate a suitable crank by which the shaft and knives may be rotated while in engagement with the emery wheels.

*Operation*

The operation of the device is as follows: Rotation of motor 133 rotates the set of cutting knives operatively coupled therewith at high speed and in counterclockwise rotation and operates the feed chains 30, bread propeller-carrying chains 61, discharge conveyor 123, and the tray feeding device in predetermined timed relation. Loaves of bread 170 are successively deposited on the receiving end of feed table 20 at the center thereof between the guide bars 124 whereby one loaf is engaged by each of the transverse members 31 carried by chain 30 and by which the loaves are slid along said table. The transverse members 31 slide the loaves of bread to the discharge end of the feed table and onto the receiving arms 37 of the cutter table 35. A set of bread propelling fingers 71 carried by chains 61 then engages the bread deposited on receiving arms 37 and slides it along the cutting table 35, the lower free end of said fingers engaging grooves 72 in the cutter table by which they are guided and held in correct operative relation. The fingers 71 slide the individual loaves of bread to and through the rapidly rotating cutter knives 40, which, due to the great difference in the rate of movement of the bread and knives and the configuration of the cutting edges of the knives, slowly cut through the bread to slice it in thicknesses determined by the spacing of the knives. When the bread passes the center of the knives the upper edges of the slices are engaged by fingers 82 which prevent them from being thrown from the cutting table by the rapidly rotating knives. The fingers 82 move with the bread until it is clear of the knives, in the manner illustrated in Figure 10, being urged forwardly in the direction of movement of the bread by engagement of the propelling members 65 and held in operative engagement with the upper edge of the bread slices by the spring 83, the movement of the fingers being accommodated by the pin and slot connection 78, 80 between the plate 79 and rod 78 carried by frame 36. When the rod 78 has reached the end of slot 80 the bread slices will have cleared the knives, and continued movement of the bread propeller 65 will tilt the fingers 82 upwardly against the action of spring 83, a suitable notch in the plate 79 of said fingers being provided to accommodate said tilting relative to the positioning bar 81 which normally holds the plate 79 in horizontal position. The fingers 82 thus ride over the bread propeller 65 and then assume their normal operative position between the knives under the influence of spring 83 after the propeller 65 has passed therebeneath and before the succeeding propeller has forced the bread half-way through the knives.

The sliced loaf of bread is then continuously slid along the cutting table away from the knives, each slice of bread being engaged and propelled by one of the fingers 71 registering therewith, and the slices are held in loaf-like relative position by the guide bars 124. As the sliced bread nears the discharge end of the cutting table it engages the spaced arms 107 projecting slightly above the table top and pivots said arms in slots 108 against the action of springs 109. The pivotal movement of arms 107 causes the cam or nose 110 thereof to engage and push on the tray 171 mounted on plate 86 beneath end plate 85 of the cutting table to push said tray in the direction of movement of the bread and its upper end up onto the inclined plate 103, thus tilting the tray upwardly whereby its outer upper edge will be positioned above the level of the top of the cutting table. The cut-aways 100 in end plate 85 accommodate the sides of the tray when in this tilted position, the adjustable plates 101 being positioned relative to the cut-aways to permit the sides of the tray to pass therebetween and also serving to guide the movement of the tray to tilted position. As the bread reaches the end of the cutting table it engages the outer tilted side of the tray and pushes it therewith gradually depressing the spring pressed plate 103, so that when the bread has reached the end of the cutting table the tray will be in a position therebeneath to receive it as it drops from the table guided and held in unitary loaf-like position by guide plates 125, at which time the tray will overlie the edge of the plate 103 which will be further depressed under the weight of the bread to permit the end of the tray overlying the outer end of plate 103 to engage the discharge conveyor belt 123 by the movement of which the bread and tray will be drawn from plate 103 and carried to the discharge end of the device. After the propeller fingers 71 have pushed the bread from the cutting table into the trays, the rollers 73, carried by the finger carrier 64 and positioning said carrier by means of its engagement with the guide bar 74, engage the cam 75 of said guide bar and permit the carrier to be tilted by spring 76 in a manner whereby the fingers 71 will be swung rearwardly into tilted position and clear of the bread while the same is being carried away on the discharge conveyor 123, said cam 75 being longitudinally adjustable to accommodate the tilting of the propellers at the proper time when bread of any kind or size is fed through the device. The coaction of the parts of the device in the bread traying operation is clearly shown in Figure 11 of the drawings.

*Mechanism for feeding the trays*

The operation of the mechanism for feeding the trays to bread receiving position is as follows: A number of trays are placed on the inclined plate 111 with the lowermost one bearing on plate 112. The chain 87 is driven in reciprocating movement by the reciprocating rack 95 engaging the gear 94 and thus moves the member 99 back and forth on plate 86 from the outer end thereof to a position beneath the end plate 85, the length of reciprocating movement being regulated by the point of attachment of the connecting rod carrying the rack with the disc 97; and the rate of rotation of disc 97 is timed with the movement of chain 61 by the chain connection 156 with shaft 59. As the member 99 moves away from the cutting table toward the end of the plate 86 the pin 116 carried thereby engages the inclined groove 115 in plate 112 and as it moves through said groove the plate is depressed against the action of springs 114 until it is positioned with its upper edge at the level of plate 86 by the riding of the pin on said upper edge and on arm 118 thereof thus permitting one of the trays on the inclined plate to slide onto plate 86 in front of member 99. When the pin 116 moves past arm 118, the plate is released and is returned by springs 114 to normal partition-forming position preventing the next tray from sliding onto the plate 86 as the member 99 moves forwardly to position the first tray beneath the cutting table. As the member 99 moves forwardly the pin 116 passes under arm 118 and is then rearwardly swung against the action of spring 117 by its engagement with the plate 112 as it passes said plate. The stop plate 102 is adjustably positioned on plate 86 to stop the tray in operative position beneath end plate 85 of the cutting table and thus coacts with the adjustable connection of the connecting rod carrying rack 95 with the disc 97 to operatively position trays of various sizes in operative position relative to the cutting table. The adjustable plates 101 may also be positioned to receive the sides of trays of varying size therebetween when tilted to bread-receiving position.

It will be seen that by the provision of the removable center plate 55 of the cutting table, the two sets of knives 40 and 165, the adjustability of guide bars 124, the provision of removable sets of fingers 71, and the adjustability of the tray feeding device, the instant device is adapted for universal use for the cutting and traying of loaves of white, rye and other kinds of bread of varying sizes. The mounting of the knife shafts 41 in separable bearings 42 carried by arms 43 permits ready removal of the shafts for repairs, and the relative positioning of the knives on the shaft by means of spacers 46 and jam nut 51 permits quick removal of broken knives and quick changes in the spacing of the knives by the use of different sized spacers.

Figure 15:
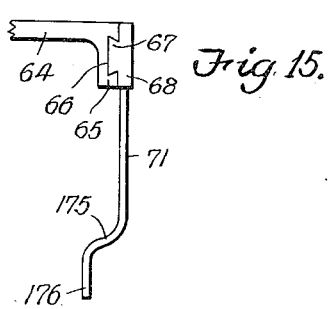
Figure 15 is a fragmentary side elevation of the propeller illustrating a modified construction of the fingers.

In Figure 15 is illustrated a modified construction of the fingers 71 in which said fingers are rearwardly bent at 175 in spaced relation above their lower ends, said fingers terminating in offset lower portions 176 subsantially parallel to the major portion of said fingers. This construction of fingers provides a pocket for the reception of bread on the table, and is particularly adapted for use in slicing rye and other odd-shaped loaves of bread, for which purpose the off-set of the fingers of the set may be varied to engage the bread at all points of its length.

It is to be understood that while my device is particularly adapted for slicing and packaging bread, it may be employed with equal facility for slicing and packaging other baked goods, confections, and any other bodies of material which are adapted to be sliced and packaged for their respective trades.

The invention having been set forth, what is claimed as new and useful is:

1. In combination, a cutting table having a plurality of spaced parallel slots formed therein, a plurality of sets of rotary knives pivotally carried by said table and adapted to project through said slots, means selectively positioning one of said sets of knives in operative projecting position, means for rotating said knives when disposed in operative position, a propeller spaced above said table, and spaced fingers depending from said propeller and adapted to pass between said spaced knives to move a body of material along said table and through said knives.

2. In combination, a cutting table, a knife carried by said table, a propeller for moving a body of material along said table to be sliced by said knife, a support positioned adjacent said knife, a member pivotally depending from said support for engaging the material as it is sliced by said knife, and a spring normally holding said depending member in material engaging position, said support and depending member having a pin and slot connection, whereby said propeller moves said depending member relative to said table with said material as the material is being sliced, said propeller pivoting said depending member out of engagement with said material against the action of said spring after the material has been sliced.

3. The combination with a slicing machine having a cutting table, of a propeller for moving material to be sliced along said table comprising a member shiftable relative to said table and including a portion extending transversely of said table having a wedge-shaped groove formed in one face thereof, a material-contacting element having a wedge-shaped tongue insertable in said groove, and a spring-pressed member carried by said transverse portion and engaging said material-contacting element to lock said element in operative position.

4. The combination with a slicing machine having a cutting table, of a propeller for moving material to be sliced along said table comprising a member shiftable relative to said table, a material-contacting element removably carried by said shiftable member, said material-contacting element having a tongue and groove connection with said shiftable member and spring means for locking said tongue and groove connected members against relative movement.

5. In combination, a cutting table having means for slicing a body of material, a propeller adapted to move a body of material along said table and through said slicing means to the discharge end of the table, and means shiftable bodily relative to said table disposed above said table and adjacent said slicing means in the path of movement of said propeller for engaging the material while it passes through said slicing means to hold the material on said table in operative relation to said propeller, said propeller shifting said last named means with said material and longitudinally of said table while said material passes through said knives.

6. In combination, a table having means for slicing a body of material, a propeller for moving a body of material along said table and through said slicing means to the discharge end of said table, and longitudinally shiftable and pivotally mounted means disposed above said table adjacent said slicing means and extending rearwardly in the direction of movement of and into the path of movement of said propeller, said last named means being shiftable longitudinally of said table by said propeller to engage the material while it passes through said slicing means to hold the material on said table in operative relation to said propeller, said propeller pivoting said last named means away from said material when the material has passed through said slicing means.

7. In combination, a cutting table, a knife carried by said table, a propeller for moving a body of material along said table to be sliced by said knife, a support positioned adjacent said knife and above said table, a member pivotally depending from said support extending rearwardly in the direction of movement of and into the path of movement of said propeller and shiftable longitudinally of said table with said material by said propeller for engaging the material as it is sliced by said knife, said propeller pivotally moving said depending member out of engagement with said material after said material has been sliced.

8. In combination, a cutting table, a knife carried by said table, a propeller for moving a body of material along said table to be sliced by said knife, a support positioned adjacent said knife and above said table, a member pivotally depending from said support extending rearwardly in the direction of movement of and into the path of movement of said propeller and bodily shiftable relative to said support by said propeller for engaging the material as it is sliced by said knife, and a spring normally holding said depending member in material-engaging position, said propeller pivotally moving said depending member out of engagement with said material after the material has been sliced.

LEROY W. LUTHER.